United States Patent
Gerasopoulos et al.

(10) Patent No.: US 12,051,781 B2
(45) Date of Patent: Jul. 30, 2024

(54) AEROSOL JET PRINTED LITHIUM BATTERY

(71) Applicant: The Johns Hopkins University, Baltimore, MD (US)

(72) Inventors: Konstantinos Gerasopoulos, Odenton, MD (US); Bing Tan, Ann Arbor, MI (US); Priestly T. Shuler, Baltimore, MD (US); Matthew W. Logan, Columbia, MD (US); Sarah K. Adams, Olney, MD (US); Matthew A. Hagedon, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 59 days.

(21) Appl. No.: 17/380,527

(22) Filed: Jul. 20, 2021

(65) Prior Publication Data
US 2022/0102751 A1 Mar. 31, 2022

Related U.S. Application Data

(60) Provisional application No. 63/083,247, filed on Sep. 25, 2020.

(51) Int. Cl.
*H01M 4/04* (2006.01)
*B29C 64/112* (2017.01)
(Continued)

(52) U.S. Cl.
CPC ......... *H01M 10/058* (2013.01); *B29C 64/112* (2017.08); *B33Y 10/00* (2014.12);
(Continued)

(58) Field of Classification Search
CPC ..... H01M 10/058; B33Y 10/00; B29C 64/112
See application file for complete search history.

(56) References Cited

U.S. PATENT DOCUMENTS

| | | | |
|---|---|---|---|
| 7,987,813 B2 * | 8/2011 | Renn | C23C 18/06 118/62 |
| 2002/0031706 A1 * | 3/2002 | Dasgupta | H01M 4/621 429/231.95 |

(Continued)

OTHER PUBLICATIONS

Deiner et al. "Inkjet and aerosol jet printing of electrochemical devices for energy conversion and storage" (2017).*

(Continued)

*Primary Examiner* — Austin Murata
(74) *Attorney, Agent, or Firm* — Sung Kim

(57) ABSTRACT

A method of manufacturing a three-dimensional electrochemical lithium battery includes forming a first electrode on an underlying layer comprising aerosolizing a first ink formulation comprising a slurry including nanoparticles or microparticles of a first active material and a binder, and depositing the slurry onto the underlying layer to form a first electrode layer. A permeable separator layer is formed on the first electrode by aerosolizing a polymer precursor solution, exposing the aerosolized polymer precursor solution to a first activating radiation source to form partially cured polymer spheres in the aerosolized stream, focusing and directing the aerosolized stream onto a substrate to form the permeable separator layer of the partially cured polymer spheres, and exposing the partially cured polymer spheres on the substrate to a second activating radiation source to fully cure the partially cured polymer spheres. A second electrode is formed on the permeable separator layer by aerosolizing a second ink formulation comprising a slurry including nanoparticles or microparticles of a second active material and a binder, and depositing the slurry onto the permeable separator layer.

16 Claims, 10 Drawing Sheets

(51) Int. Cl.
  *B33Y 10/00* (2015.01)
  *B33Y 80/00* (2015.01)
  *H01M 10/058* (2010.01)
  *H01M 4/131* (2010.01)
  *H01M 4/133* (2010.01)
  *H01M 4/134* (2010.01)
  *H01M 4/136* (2010.01)
  *H01M 4/62* (2006.01)
  *H01M 4/66* (2006.01)
  *H01M 10/0525* (2010.01)

(52) U.S. Cl.
  CPC ........... *B33Y 80/00* (2014.12); *H01M 4/0419* (2013.01); *H01M 4/131* (2013.01); *H01M 4/133* (2013.01); *H01M 4/134* (2013.01); *H01M 4/136* (2013.01); *H01M 4/622* (2013.01); *H01M 4/661* (2013.01); *H01M 10/0525* (2013.01)

(56) References Cited

U.S. PATENT DOCUMENTS

| | | | | |
|---|---|---|---|---|
| 2006/0134526 | A1* | 6/2006 | Han | H01M 50/446 429/251 |
| 2009/0114151 | A1* | 5/2009 | Renn | B05D 1/02 118/698 |
| 2016/0013512 | A1* | 1/2016 | Bae | H01M 10/0565 429/304 |
| 2017/0348903 | A1* | 12/2017 | Renn | B33Y 80/00 |
| 2019/0305359 | A1* | 10/2019 | Deiner | C08K 3/013 |
| 2020/0112030 | A1* | 4/2020 | Panat | H01M 4/38 |
| 2020/0136129 | A1* | 4/2020 | Deiner | H01M 4/505 |
| 2020/0153037 | A1* | 5/2020 | Renna | B01J 6/008 |

OTHER PUBLICATIONS

Yu et al. "Direct aerosol printing of lithium-ion batteries" (2017).*
Pang et al. "Additive manufacturing of batteries" (2019).*
https://corporate.evonik.com/en/media/press-releases/corporate/batteries-from-the-printer-evonik-presents-a-new-technology-at-the-lopec-trade-show-109783.html. "Batteries from the printer: Evonik presents a new technology at the LOPEC trade show." Evonik press release, Mar. 19, 2019.
https://nanopaint-tech.com/products/functional-inks/. "Functional Inks." Nanopaint website.
https://nanopaint-tech.com/wp-content/uploads/nanopaint-anode-inks-datasheet.pdf. "Nanopaint Anode-1 Ink." Nanopaint Technical Data Sheet, 2017.
https://nanopaint-tech.com/wp-content/uploads/nanopaint-cathode-inks-datasheet.pdf. "Nanopaint Cathode-1 Ink." Nanopaint Technical Data Sheet, 2017.

* cited by examiner

AEROSOL JET PRINTED LITHIUM BATTERY

CROSS-REFERENCE TO RELATED APPLICATIONS

This application claims the benefit of U.S. Provisional Application Ser. No. 63/083,247, filed on Sep. 25, 2020, which is expressly incorporated by reference herein in its entirety.

STATEMENT REGARDING FEDERALLY SPONSORED RESEARCH OR DEVELOPMENT

This invention was made with Government support under Contract No. N00024-13-D-6400 awarded by the United States Department of the Navy. The Government has certain rights in the invention.

TECHNICAL FIELD

Embodiments of the present disclosure generally relate to lithium batteries, and more particularly, to materials, chemistries, and aerosol jet printing processes for fabricating at least the anode, cathode, and separator layers of a lithium battery in their entirety.

BACKGROUND

Additive manufacturing (AM) processes are fabrication methods that allow one to produce functionally complex parts layer-by-layer, without the use of molds or dies. There are a variety of methods of additive manufacturing utilizing a variety of different feedstock materials, e.g., plastics, metals, ceramics, composites, or the like. One such method is an aerosol jet printing (AJP) process, which is a direct write additive manufacturing process that is distinct from ink jet and extrusion printing processes. Aerosol jet printing allows a higher print resolution, namely, almost 2 to 4 times higher than inkjet, for example. The AJP process generally utilizes aerodynamic focusing to precisely deliver fluid and nano-material formulations, via ultrasonic or pneumatic means, to produce droplets on the order of one to two microns in diameter. Advantageously, the AJP process is conformal in the printing process due to the relatively large stand-off distances used between the nozzle and the substrate. Moreover, compared to other direct write technologies, aerosol printing accepts a wider range of viscosities.

Electrochemical batteries are chemical storage systems that interconvert chemical energy and electrical energy through redox reactions of cathode and anode materials. Electrochemical batteries generally include two electrodes, i.e., the cathode and the anode, which are separated by an electrolyte and a porous separator. During a discharge cycle, atoms in the anode are ionized and separated from their electrons. The ions move from the anode and pass through the electrolyte until they reach the cathode, where they recombine with their electrons and electrically neutralize.

BRIEF SUMMARY

Disclosed herein are additive manufacturing methods for forming three-dimensional electrochemical lithium batteries and porous polymeric separator layers for the battery. The additive manufacturing methods generally include an aerosol jet printing method.

In one or more embodiments, a method of manufacturing a three-dimensional electrochemical lithium battery includes forming a first electrode on an underlying layer comprising aerosolizing a first ink formulation comprising a slurry including nanoparticles or microparticles of a first active material and a binder, and depositing the slurry onto the underlying layer to form a first electrode layer. A permeable separator layer is formed on the first electrode by aerosolizing a polymer precursor solution, exposing the aerosolized polymer precursor solution to a first activating radiation source to form partially cured polymer spheres in the aerosolized stream, focusing and directing the aerosolized stream onto a substrate to form the permeable separator layer of the partially cured polymer spheres, and exposing the partially cured polymer spheres on the substrate to a second activating radiation source to fully cure the partially cured polymer spheres. A second electrode is formed on the permeable separator layer by aerosolizing a second ink formulation comprising a slurry including nanoparticles or microparticles of a second active material and a binder, and depositing the slurry onto the permeable separator layer.

In one or more embodiments, a method of manufacturing a three-dimensional electrochemical lithium battery includes forming a first electrode on an underlying layer including aerosolizing a first ink formulation comprising a slurry including nanoparticles or microparticles of a first active material and a binder, and depositing the slurry onto the underlying layer to form a first electrode layer. A permeable separator layer is formed on the first electrode by aerosolizing a slurry including metal oxide nanoparticles or microparticles and a binder, and depositing the slurry onto the first electrode. A second electrode is formed on the permeable separator layer by aerosolizing a second ink formulation comprising a slurry including nanoparticles or microparticles of a second active material and a binder, and depositing the slurry onto a permeable separator layer.

In one or more embodiments, an aerosol jet printing method for manufacturing a permeable separator layer for a battery includes aerosolizing a solution including a polymer precursor and a photoinitiator to generate an aerosolized stream within an aerosol jet printing device; exposing the aerosolized stream to a first activating radiation source to form partially cured polymer spheres therein; focusing and discharging the aerosolized stream of partially cured polymer spheres from the aerosol jet printing device onto a substrate to form a permeable separator layer of the partially cured polymer spheres; and exposing the partially cured polymer spheres on the substrate to a second activating radiation source subsequent to the discharging to fully cure the partially cured polymer spheres and form a permeable separator layer.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
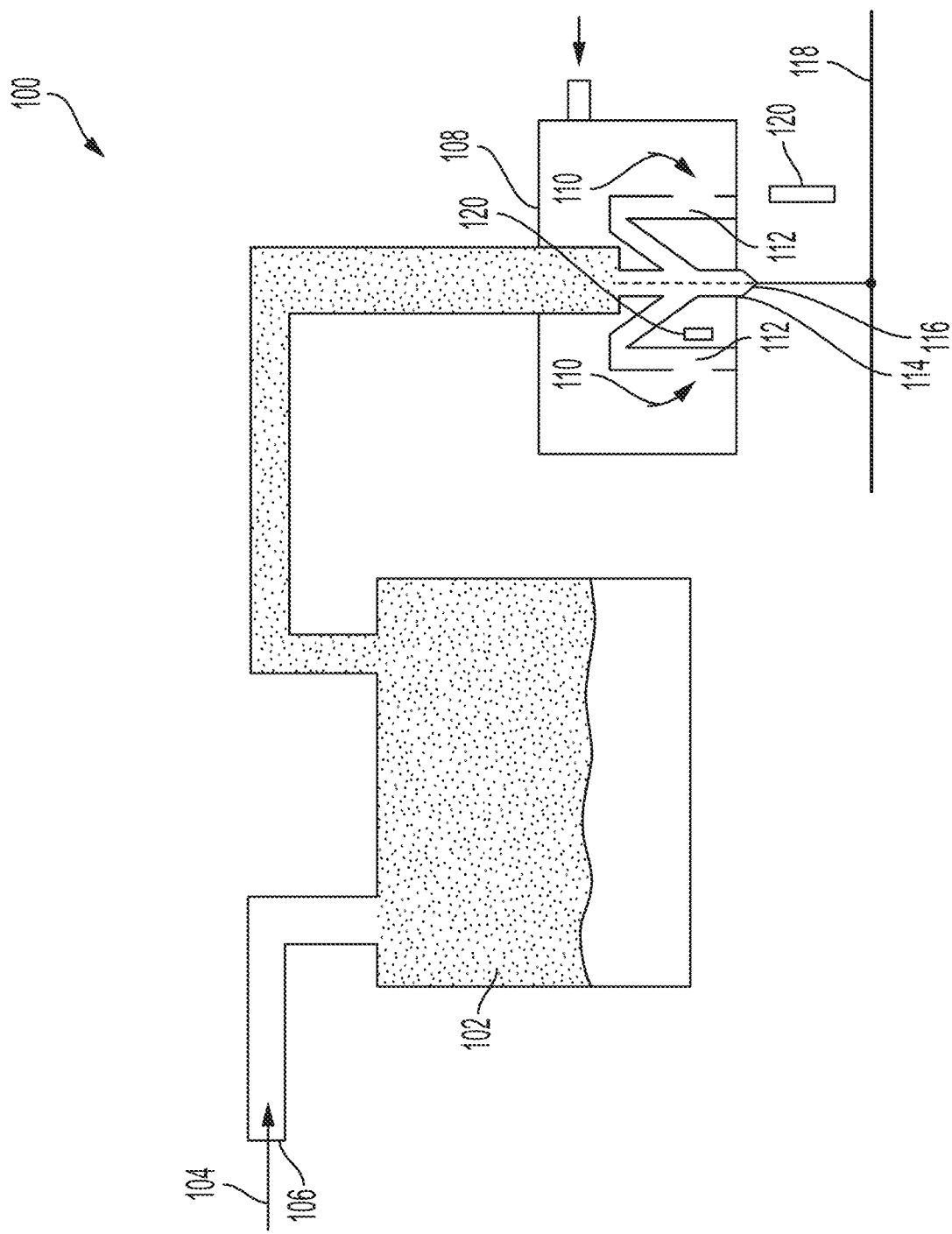
FIG. 1 depicts an exemplary aerosol jet printing device suitable for printing a three-dimensional electrochemical battery in accordance with the present disclosure.
Figure 2:
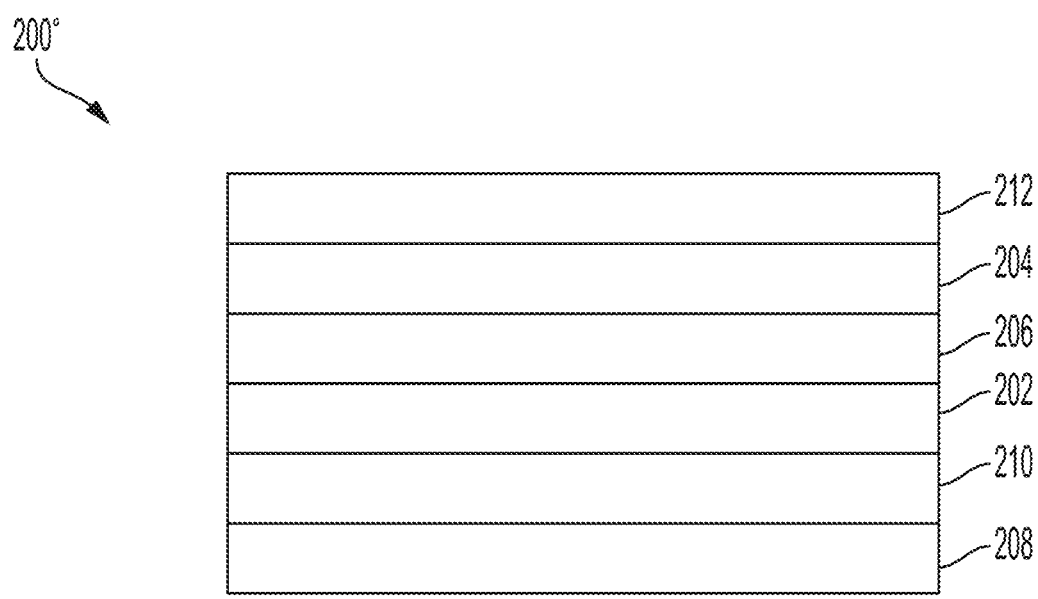
FIG. 2 schematically illustrates a three-dimensional battery construction in accordance with the present disclosure.

Disclosed herein are three-dimensional electrochemical lithium ion batteries, which generally include an anode layer, a cathode layer, and a separator layer fabricated using an aerosol jet printing (AJP) process. As noted above, AJP is a contactless direct write additive manufacturing method, wherein a formulated ink is ultrasonically or pneumatically aerosolized to form an aerosolized stream, which is directed to a substrate. Unlike other printing methods such as ink jet and extrusion printing, AJP can accomplish small feature sizes on the order of 5 to 10 microns (μm) as well as provide high conformality due in part to the relatively large stand-off distances between the nozzle and the substrate, wherein the stand-off distances are typically about 1 millimeter (mm) to 5 mm Because of the high degree of conformality afforded by the AJP process, the three-dimensional electrochemical batteries can be built directly onto or integrated into any complex substrate, which does not necessarily need to be planar.

The AJP process generally includes formulating various nanoparticulate inks with specific rheology and compositional properties to form the various layers in the three-dimensional battery by the AJP process. It should be noted that conventional techniques related to AJP processes for forming the three-dimensional batteries as described herein may or may not be described in detail herein. Moreover, the various tasks and process steps described herein can be incorporated into a more comprehensive procedure or process having additional steps or functionality not described in detail herein. In particular, various steps in the aerosol jet printing processes are well known and so, in the interest of brevity, many conventional steps will only be mentioned briefly herein or will be omitted entirely without providing the well-known process details. It should, however, be noted that aerosol jet printing processes have not previously been utilized to form lithium batteries in their entirety including, but not limited to the anode, cathode, and porous separator.

Generally, the AJP process includes aerosol generation using either an ultrasonic or pneumatic atomizer. An inert carrier gas is then introduced to transport a stream of the aerosol, which is then focused and deposited onto a substrate. Production of the aerosol is relatively complex and is generally dependent on the particular atomization technique and the rheological properties of the ink formulation. In the present disclosure, the ink formulation for forming the anode and cathode layers includes a slurry or dispersion of nanoparticles and/or microparticles of active materials. With regard to the permeable separator layer, the ink formulation can be a slurry or dispersion including ceramic nano- or microparticles such as $Al_2O_3$, a polymer binder such polyvinylidene fluoride (PVDF), and a solvent such as N-methyl-2-pyrrolidone (NMP). Upon deposition of the ink through the nozzle, evaporation of the solvent can be controlled to create a desired porosity in the separator layer. In other embodiments, the ink formulation can be a solution including a polymer precursor, a photopolymerization initiator, and a solvent. In these embodiments, one or more activating radiation sources are typically positioned within the misting tube of an AJP device prior to discharge through the nozzle such that photopolymerization can occur and form partially cured spheroids of polymerized particles. Once deposited onto the substrate, the partially cured polymer spheres are fully cured with additional activating radiation or applied heat to form a permeable membrane including a plurality of tortuous pathways throughout the membrane. The size of the polymerized solid particles can be modified based on the operating parameters of the AJP device to provide the separator layer with a desired and uniform porosity. The layers formed using the AJP process can be formed from a single pass or multiple passes to obtain the desired thicknesses. In one or more embodiments, print speed can be significantly decreased to minimize the number of passes for the desired thickness.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of embodiments of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Referring now to FIG. 1, an exemplary AJP device 100 suitable for printing the anode, the cathode, and the separator layers is shown. The illustrated AJP device is not intended to be limited and is merely exemplary of a typical AJP device. The exemplary AJP device includes a first vessel 102 for containing an ink formulation, which generally includes a slurry or dispersion of nanoparticles and/or microparticles of an active material, a binder, and a solvent for fabricating a respective electrode layer or ceramic nanoparticles, binder and solvent or a solution including a polymer precursor, photoinitiator, and solvent for fabricating the porous separator layer. An aerosol of the slurry/dispersion or solution is generated within the vessel 102 using either a pneumatic or ultrasonic atomizer A carrier gas 104 is introduced into the vessel 102 via inlet 106 to transport a stream of the aerosol from the vessel 102 and into a deposition chamber 108, wherein the aerosol stream is refined by introduction of additional carrier gases 110 via secondary conduits 112 adjacent a primary conduit 114 (also referred to herein as a "misting tube"). The secondary flow of the carrier gas constrains and constricts the aerosol stream within an annular sheath that forms an interlayer between the aerosol and the physical components of the device. In this manner, the aerosol stream can be highly focused, i.e., collimated, and discharged through nozzle 116 and onto an underlying substrate 118. The nozzle 116 can be translatable in the x, y, and z directions relative to the substrate or the substrate can be translatable in the x, y, and z directions relative to the device.

In embodiments utilizing polymer precursors, during fabrication of the separator layer, which is porous, the AJP device can be supplemented with one or more activating radiation sources 120, e.g., a UV light source or other activating radiation light source, positioned to project activating radiation to the aerosolized stream prior to discharge from the nozzle to partially cure the aerosolized polymer droplets and subsequent to deposition onto the substrate to form a cohesive and fully cured permeable separator. The activating radiation source, prior to discharge from the AJP device, activates the photoinitiator to radically polymerize the polymer precursor in a known manner to form the partially cured polymeric droplets, e.g., spheres or sphere-like. The resulting partially cured polymeric droplets impact the substrate surface and substantially maintain its droplet shape, i.e., its sphere-shape or sphere-like shape. The partially cured polymeric spheres form a cohesive layer with uniform pore distributions that provide the separator with permeability in the form of tortuous pathways. Subsequent heating and/or additional activating radiation can fully cure and crosslink the permeable separator layer. As will be described in greater detail below, the aerosolized stream of partially cured polymer droplets can be monodisperse, highly dense, and have a sphere or sphere-like shape with sufficient inertia to be impacted on the substrate 118 and form a uniform, highly conformal, cohesive layer.

Turning now to FIG. 2, a three-dimensional electrochemical battery 200 generally includes an anode layer (i.e., negative electrode) 202, a cathode layer (i.e., positive electrode) 204, and a porous separator layer 206 between the anode and cathode layers. As will be described in greater detail below, each of these layers 202, 204, and 206 are fabricated by the AJP process. The electrochemical three-dimensional battery can be fabricated on a substrate 208, which is generally an inert, non-conductive, and non-reactive material that can withstand the processing conditions for fabricating the various layers. The substrate can be substantially planar or non-planar. An exemplary substrate is Kapton™, which is a polyimide and is stable and electrochemically inert. Each of the anode and cathode layers typically include a corresponding positive and negative current collector 210, 212, such as aluminum and copper, for the cathode and anode, respectively. The current collectors can be in the form of foils, meshes, coatings, foams, or the like. By way of example, the current collectors can be powdered coatings that are subsequently sintered to form a cohesive layer.

Ink formulations for fabricating the anode and cathode layer generally include preparing a slurry or dispersion containing an active material, a binder, and a solvent. The ink formulations are generally formulated to have a viscosity within a range of about 0.5 to about 2,000 centipoise (cP). In one or more other embodiments, the ink formulation has a viscosity within a range of about 1 to about 1000 cP; and in still one or more other embodiments, the ink formulation has a viscosity within a range of about 50 to about 500 cP. Typically, the active material may be from 60% to 97% by weight (wt %), binder may be from 1 wt % to 25 wt %, and conductive additive may be from 1.5 wt % to 15 wt %.

Suitable active materials for fabricating the anode layer by AJP include, but are not intended to be limited to, silicon, graphene, natural graphite, synthetic graphite, carbon, silicon carbon composites, lithium titanate (LTO), niobium oxide, tin, antimony combinations including at least one of the foregoing, and the like.

Suitable active materials for fabricating the cathode layer by AJP include, but are not intended to be limited to, lithium nickel cobalt aluminum oxides (NCA) lithium cobalt oxides (LCO), lithium nickel manganese oxide (LNMO), lithium manganese iron phosphates (LMFP) lithium iron phosphate (LFP), lithium manganese oxide (LMO), lithium cobalt oxide (LNCO), lithium cobalt alumni oxide (LNCAO), lithium nickel cobalt manganese oxide (LNCMO), combinations including at least one of the foregoing, and the like.

As noted above, the active materials for forming the anode and the cathode are generally in the form of nanoparticles and/or microparticles. In one or more embodiments, the particle size is within a range of about 10 nanometers (nm) to about 9000 nm or more. In other embodiments, the nanoparticles and/or microparticles used to formulate the ink have a particle size within a range of about 100 nm to about 1000 nm, and in still other embodiments the nanoparticles used to formulate the ink have a particle size of about 100 nm to about 200 nm. For example, nanoparticles inks have been formulated for printing nanosized silicon particles, natural graphite with micro-flake morphology, lithium iron manganese phosphate, and the like. As will be demonstrated in the examples below, the resulting AJP electrochemical three-dimensional batteries have been found to perform comparable to electrochemical three-dimensional batteries formed of the same materials using conventional blade-coating processes.

The binders in the anode and cathode ink formulations act to maintain electrode integrity and adhesion to the current collector. The binders are not electrochemically active. Thus, the less binder added, the more electrochemically active material can be added, thus increasing the energy density and cell capacity. In one or more embodiments, the binder can be about 1 weight percent (wt %) to about 25 wt % based on weight of the active material and binder. In other embodiments, the binder can be about 1 to about 10 wt % based on weight of the active material and binder, and in still other embodiments, be about 1 to about 5 wt % based on weight of the active material and binder.

Suitable binders include polymers or copolymers, but are not intended to be limited to, cellulose based polymers such as carboxymethyl cellulose (CMC), polyethylene oxide (PEO), polyvinylidene fluoride (PVDF), polyethyleneimine (PEI), polyvinyl chloride (PVC), styrene-butadiene rubber (SBR), polytetrafluoroethylene (PTFE), ethylene propylene diene monomer (EPDM) rubber and other rubbers, polyacrylic acid (PAA), poly(methyl acrylate) (PMA), poly (vinyl alcohol) (PVA), poly(vinyl acetate) (PVAc), polyacrylonitrile (PAN), polyisoprene (Plpr), polyaniline (PANi), polyethylene (PE), polyimide (PI), polystyrene (PS), polyurethane, polyvinyl butyral (PVB), polyvinyl pyrrolidone (PVP) and modifications and combinations thereof.

The separator is a permeable membrane placed between a battery's anode and cathode. The main function of the separator is to keep the two electrodes apart to prevent electrical short circuits while also allowing the transport of ionic charge carriers that are needed to close the circuit during the passage of current in an electrochemical cell. In one or more embodiments, the separator is a polymeric membrane forming a microporous layer. In other embodiments the porous separators can be formed of a metal oxide ceramic. The separator, once formed, is chemically and electrochemically stable with regard to the electrolyte and electrode materials and mechanically strong enough to withstand the high-tension during battery construction.

The separator should have sufficient pore density to hold liquid electrolyte or support a solid-state electrolyte that enables ions to move between the electrodes. Typically, a Li-ion battery separator provides porosity of about 40% although higher or lower amounts of porosity can be used depending the intended battery properties. Pore size must be smaller than the particle size of the electrode components, including the active materials and conducting additives. Ideally, the pores should be uniformly distributed while also having a tortuous structure. This ensures a uniform current distribution throughout the separator while suppressing the growth of Li on the anode.

Suitable materials for fabricating a polymeric separator by AJP include, but are not intended to be limited to, acrylate polymers PVDF, poly(vinylidene fluoride-hexafluoropropylene) (PVDF-HFP), poly(ethylene oxide) (PEO), poly (vinyl alcohol) (PVA), polyacrylonitrile (PAN), and the like. In other embodiments, the separators can be formed of a metal oxide ceramic such as, but not limited to, silicon dioxide, zirconium dioxide aluminum oxide, zeolites, and the like.

The thickness of the separator formed using AJP can be from about 10 micrometers to about 200 micrometers. In other embodiments, the thickness of the separator layer can be about 15 micrometers to about 100 micrometers, and in still other embodiments, the thickness of the separator layer can be about 15 micrometers to about 50 micrometers.

The polymeric separator is formed using the AJP process by aerosolizing an ink solution containing a polymer precursor, a photoinitiators, and a solvent or a ceramic, binder, and solvent. The AJP printing of ceramic separators generally includes forming a focused aerosolized stream followed by solvent evaporation. The AJP printing of polymeric separators generally includes partially curing the polymer precursor, i.e., a photopolymerizable monomer or monomers, using activating radiation prior to flow focusing while in the mist tube of the AJP device with a final cross link using the activating radiation subsequent to deposition onto the substrate.

Alternatively, in one or more other embodiments, the polymeric separator can be solvent printed with phase inversion induced porosity, which generally utilizes a solvent and an antisolvent. The solvent and antisolvent along with the polymer are mixed such that the polymer separator is only soluble in the solvent portion. There is typically a difference in vapor pressure that will cause the solvent having the higher vapor pressure to slowly evaporate leaving the low pressure antisolvent behind, which causes the polymer to precipitate while retaining the antisolvent. Subsequent removal of the antisolvent results in a porous film.

The liquid electrolyte for a lithium ion battery can include an aprotic solvent and a lithium salt, such as $LiPF_6$. Examples of suitable solvents include ethylene carbonate, dimethyl carbonate, diethyl carbonate, methylpropyl carbonate, ethylpropyl carbonate, ethylmethyl carbonate, butylene carbonate, ethylene carbonate, propylene carbonate, vinyl carbonate, dialkylsulfites, fluoroethylene carbonate, and combinations thereof. In further embodiments, the liquid electrolyte comprises an ionic liquid.

EXAMPLES

Hereinafter, the present disclosure will be explained in more detail by the following inventive and comparative examples, which is not intended to be limited thereto.

Example 1. Aerosol Jet Printed Lithium Nickel Cobalt Aluminum Oxide (NCA) Cathode In this example, a NCA cathode layer was aerosol jet printed and utilized in a half cell battery construction. The ink formulation was water based and included the NCA active material (95%) and a CMC/SBR binder (3%/2%). A pneumatic actuator was used to aerosolize the solution. The stage temperature was between 20° C. and 40° C. to assist in the drying of the layers. A circular wide area nozzle with a diameter of 1.5 mm was used to increase the surface area covered in each pass. A nitrogen sheath was passed through the nozzle at 800 second per cubic centimeter (sccm) to 1000 sccm. A nitrogen flow of 400 sccm was passed through the nozzle, while exhausting at 80 sccm. The AJP operated at a print speed of 1 mm/s for 40 complete passes.

The electrode was printed on a 1 centimeter (cm)×1 cm aluminum foil and dried in an oven. After drying, the electrode was transferred into an argon-filled glove box with humidity and oxygen maintained <0.5 parts per million (ppm). The electrochemical properties of half cells were then studied in 2032 coin cells with glass fiber-carbon nanofibers (GF)/C separator membranes. The counter/reference electrode was a lithium foil and the electrolyte was 1 M LiPF6 in ethylene carbonate:dimethyl carbonate (EC:DMC) at a volume ratio of 3:7.

Figure 3:
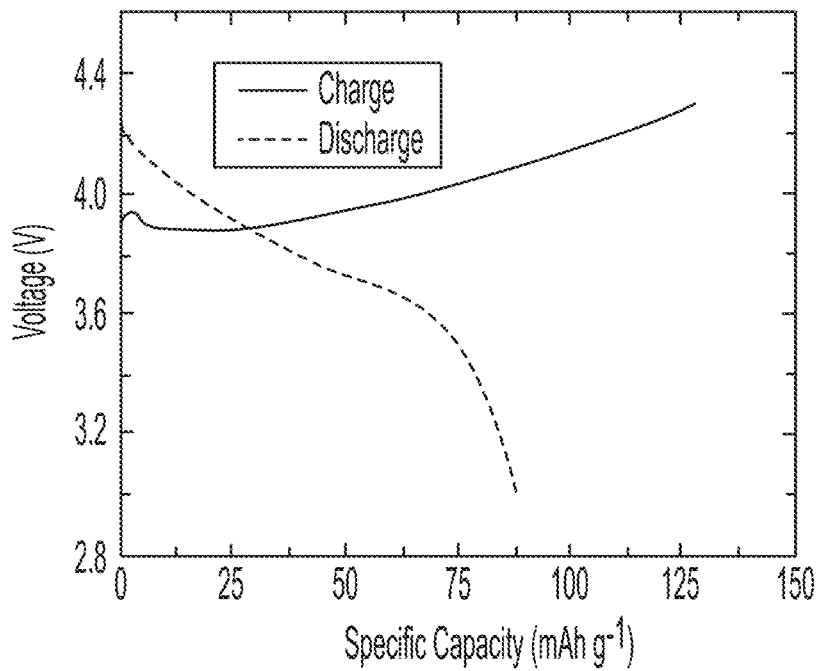
FIG. 3 graphically illustrates a charge-discharge cycle for a battery construction including an aerosol jet printed lithium nickel cobalt aluminum oxide (NCA) cathode in accordance with the present disclosure.

FIG. 3 graphically illustrates the charge and discharge cycle of the battery construction including the aerosol jet printed NCA cathode.

Example 2. Aerosol Printed Aluminum Oxide Separator

In this example, a slurry of aluminum oxide ($Al_2O_3$, 1 μm particles) and polyvinylidene fluoride binder in N-methyl pyrrolidone (NMP) was aerosol jet printed on a graphite anode.

The $Al_2O_3$ separator had a composition of 95 wt % $Al_2O_3$ and 5 wt % PVDF and was formulated in solvent at 24.25 wt %. A pneumatic actuator was used to aerosolize the solution. The stage temperature was between 80° C. and 100° C. to assist in the drying of the layers. An elongated circular wide area nozzle with dimensions of 1.5 mm×0.25 mm was to increase the surface area covered in each pass. A nitrogen sheath was pass through the nozzle at 100 seconds per cubic centimeter (sccm). A nitrogen flow of 1000 sccm was pass through the actuator was pass through the nozzle, while exhausting at 80 sccm. The AJP operated at a print speed of 3 mm/s for 20 mins. After fabrication of the separator on the graphite anode, a full cell was constructed with an LCO cathode having a capacity loading of/1.1 mAh/cm².

Figure 4:
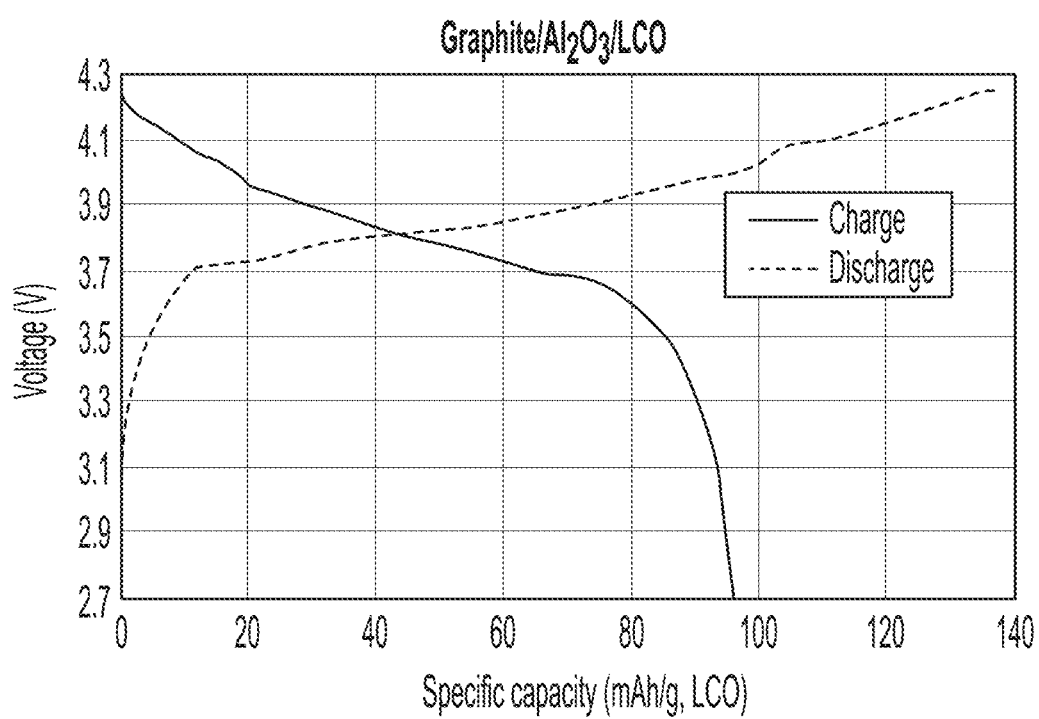
FIG. 4 graphically illustrates a charge-discharge cycle for a battery including an aerosol jet printed aluminum oxide permeable separator in accordance with the present disclosure.

FIG. 4 graphically illustrates the charge-discharge cycle for the assembled full cell including the aerosol jet printed aluminum oxide separator.

Example 3. Aerosol Jet Printed Graphite Anode

In this example, pouch lithium battery constructions including an anode layer formed of aerosol jet printed natural graphite (NG) and the same anode material using a conventional doctor blade deposition process were compared.

The aerosol jet printed graphite anode was fabricated from an anode ink formulation that included 95 wt % NG and 5 wt % polyvinylidene fluoride (PVDF) as a binder material, which was dispersion ball milled for about 20 minutes and subsequently printed using n-methyl pyrrolidone (NMP) as the solvent. The NG anode was fabricated using an Optomec™ Aerosol Jet printer. A pneumatic actuator was used to aerosolize the solution, and a stage temperature of 80° C. was used to assist in the drying of the layers. A circular wide area nozzle with dimensions a diameter of 1.5 mm was to increase the surface area covered in each pass. A nitrogen sheath was pass through the nozzle at 100 seconds per cubic centimeter (sccm). A nitrogen flow of 1150 sccm was pass through the actuator was pass through the nozzle, while exhausting at 1100 sccm. The AJP operated at a print speed of 4 mm/s for 20 minutes, which allowed for deposition of the NG/PVDF nanoparticle slurry dispersed by creating a mist of the particles guided by a carrier gas. The printer included a 1.5 mm nozzle and a printing rate was about 1.0 mg/cm². The printed pattern was then heated at a temperature of 80° C. for a period of throughout the printing process. After formation, the anode was place in a vacuum oven at 120° C. for a minimum of 2 hours.

The doctor bladed NG electrode was fabricated by using the same ink formulation but with a solids content of 30 wt %. Slurries were blade coated on a copper foil and dried in vacuum at 120° C. overnight.

The mass loading for the aerosol jet printed film was 0.93 mg/cm², while the mass loading for the doctor bladed film was 7.8 mg/cm².

Characterization of the anodes fabricated using AJP and blade doctoring is provided in Table 1 below.

TABLE 1

| | Aerosol Jet Printed Graphite Anode | | | | | |
|---|---|---|---|---|---|---|
| Method | Total Mass Loading (mg/cm²) | Coating Thickness (μm) | Calculated Film Density (g/cm³) | $1^{st}$ Discharge Specific Capacity (mAh/g) | $1^{st}$ Charge Specific Capacity (mAh/g) | $1^{st}$ Coulombic Efficiency (%) |
| AJP-1 | 0.93 | 8 | 1.16 | 386 | 261 | 68 |
| Doctor Blade | 7.8 | 66 | 1.19 | 419 | 332 | 79 |

Figure 5:
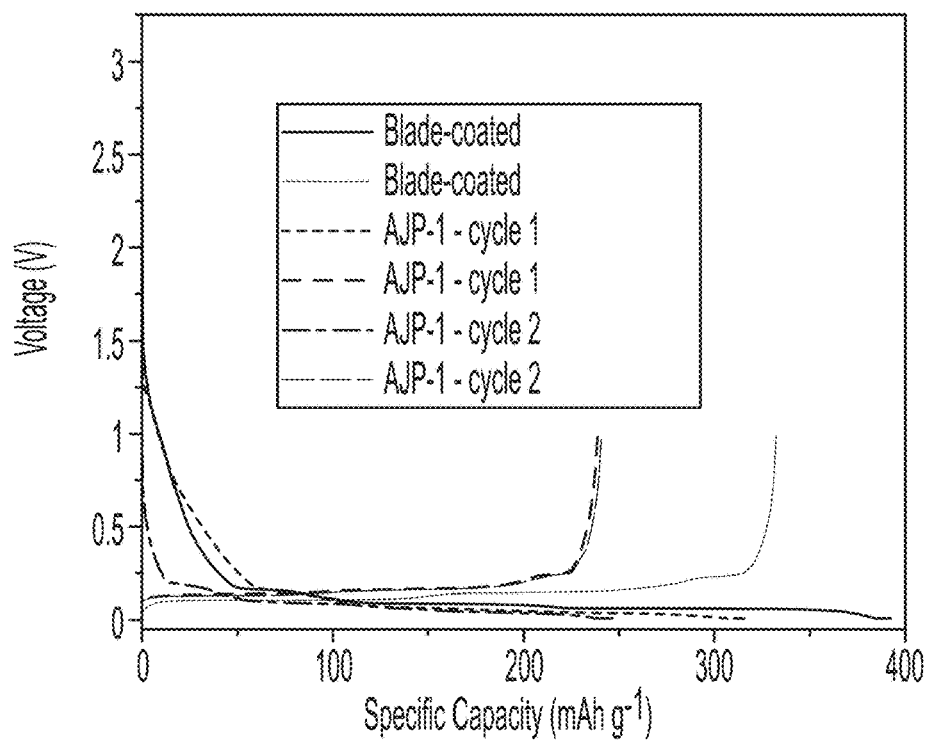
FIG. 5 graphically illustrates a charge-discharge cycle for a battery including an aerosol jet printed natural graphite (NG) anode in accordance with the present disclosure.
Figure 6:
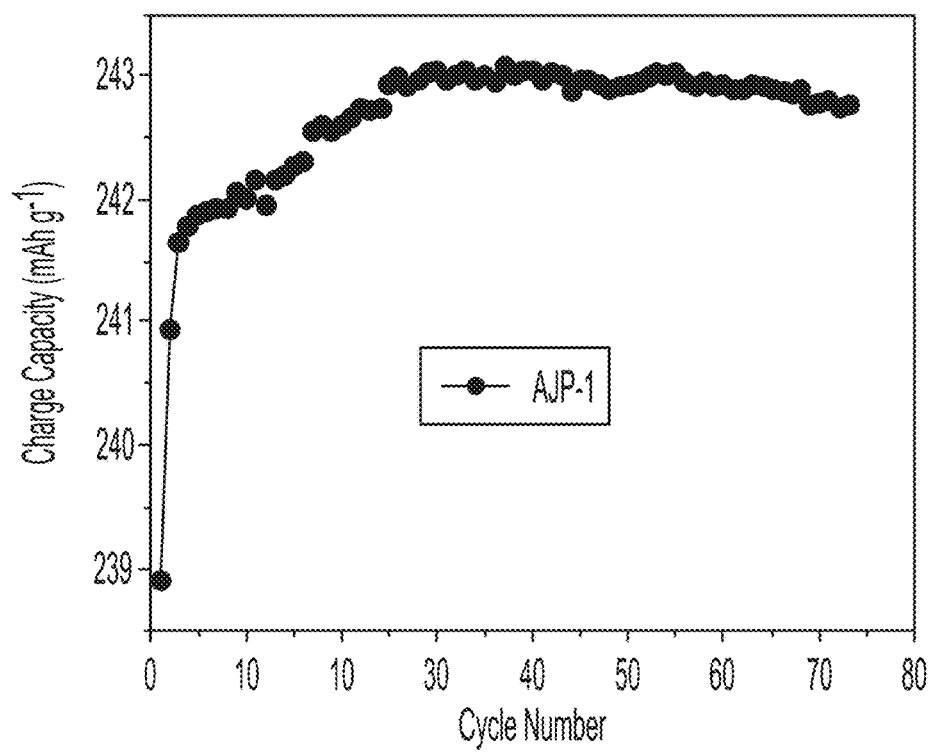
FIG. 6 graphically illustrates cycle life of the aerosol jet printed NG anode at a rate of 1.5 C in accordance with the present disclosure.

FIG. 5 illustrates a charge-discharge cycle for a battery including an aerosol jet printed NG anode in accordance with the present disclosure. As shown in FIG. 5, the reversible capacity at 0.1 C for the AJP graphite printed anode was measured to be about 261 mAh/g, which was lower than the anode construction using the doctor blade process of about 332 but still considered substantially high to make fully printed cells. Increasing the active material content through process optimization is expected to increase the reversible capacity. FIG. 6 shows the cycle life of the aerosol jet printed NG electrode at a rate of 1.5 C, which demonstrated excellent stability over 70 cycles.

Example 4. Aerosol Jet Printed Silicon Anode

In this example, an anode layer formed of silicon was printed using AJP and compared to a conventional doctor blade deposition process.

The battery cell type formed was either a coin cell format or a pouch format. The Si anode was printed on a Cu foil. The coin cell format included a lithium metal foil on a stainless disk as the counter electrode and current collector, respectively. The pouch format included a lithium metal foil on a copper foil as the counter electrode and current collector, respectively.

The aerosol ink formulation composition was 75 wt % silicon particles (100 nm), 15 wt % C65 (carbon), and 5 wt % styrene-butadiene, and 5 wt % carboxymethylcellulose (CMC), which was mixed in water/ethylene glycol at a ratio of about 6.7 grams/1.0 gram to provide a solid content of about 13 weight percent (wt %). The AJP process included aerosolizing the mixture using a pneumatic actuator. The stage temperature between 20° C. and 50° C. to assist in the drying of the layers. A circular wide area nozzle with a diameter of 1.5 mm diameter was used to increase the surface area covered in each pass. A nitrogen sheath was pass through the nozzle at 800 scum to 1000 sccm (second per cubic centimeter). A nitrogen flow of 400 sccm was pass through the actuator was pass through the nozzle, while exhausting at 80 sccm. The AJP operated at a print speed of 1 mm/s for 40 complete passes. The AJP printing rate was about 2.0 mg/cm$^2$.

The doctor blade formulation was prepared using the same ink, but with a solids content of 25 wt %. Slurries were deposited on 12 μm Cu foil and dried in a vacuum over at 120° C. overnight.

Characterization of the anodes is shown in Table 2 below. As shown therein, the coating density was markedly lower than the reference doctor blade electrode, which was calendared and pressed.

Figure 7:
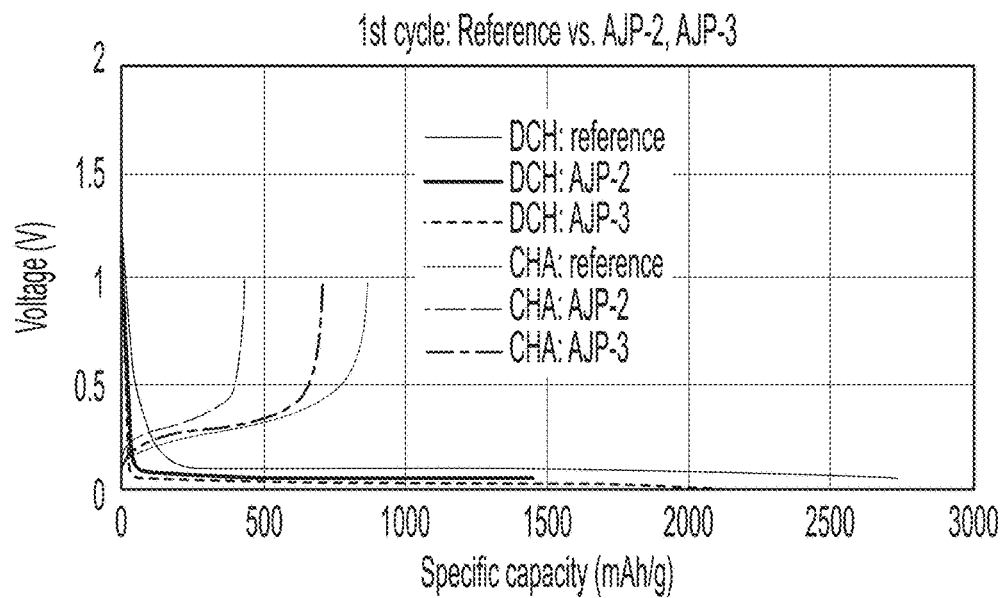
FIG. 7 graphically illustrates charge-discharge cycles for a battery including an aerosol jet printed silicon anode in accordance with the present disclosure compared to a similar doctor blade coated silicon anode.

FIG. 7 illustrates charge-discharge cycles for a battery including an aerosol jet printed silicon anode in accordance with the present disclosure compared to a similar doctor blade coated silicon anode. As shown in FIG. 7, AJP-2 exhibited about 50% of the capacities of the reference electrode (i.e., doctor blade electrode) with a similar percent coulombic efficiency when cycled between 0.05 to 1.0V. AJP-3 exhibited similar capacities as the reference electrode with a deeper cycling range of 0.005V to 1.0V. From the discharge voltage plateau, it can be suggested that the cell resistance follows the order of AJP-3>AJP-2>reference, which may be attributed to the lower density of the AJP electrodes. Overall, the AJP silicon electrode showed similar performance as the reference electrode (702 mAh/g compared to 869 mAh/g) and can be expected to function as an anode for full cells.

Example 5. Aerosol Jet Printed Lithium Cobalt Oxide (LCO) Cathode

In this example, an aerosol jet printed LCO cathode was deposited and compared to a doctor blade formed LCO. The LCO types were commercially obtained from SAFT™ and nanoparticles having a particle size of 100 nm from American Elements™. The doctor blade formulation was prepared using the same ink formulation with the commercial material obtained by SAFT, but with a solids content of 35 wt %. Slurries were deposited on 16 μm aluminum foil and dried in a vacuum over at 120° C. overnight.

The LCO had a composition of 90% LCO; 5% C65; and 5% PVDF. A pneumatic actuator was used to aerosolize the solution. The stage temperature was increased to 50° C. to assist in the drying of the layers. An elongated circular wide area nozzle with dimensions of 1.5 mm×0.25 mm to increase the surface area covered in each pass. A nitrogen sheath was pass through the nozzle at 50 sccm (second per cubic centimeter). A nitrogen flow of 1000 sccm was pass through the actuator was pass through the nozzle, while exhausting at 50 sccm. The AJP operated at a print speed of 1 mm/s for 30 mins.

TABLE 2

Silicon Anode

| Method | Cell Type | Total Mass Loading (mg/cm2) | Thickness (μm) | Calculated Film Density (g/cm3) | 1$^{st}$ Discharge Specific Capacity (mAh/g) | 1$^{st}$ Charge Specific Capacity (mAh/g) | 1sst Coulombic Efficiency (%) |
|---|---|---|---|---|---|---|---|
| AJP-2 | Coin | 0.8 | 18 | 0.44 | 1437 (0.05-1.0 V) | 433 (0.05-1.0 V) | 30 |
| AJP-3 | Coin | 2.0 | 55 | 0.36 | 2823 (0.05-1.0 V) | 702 (0.05-1.0 V) | 25 |
| AJP-4 | Pouch | 2.8 | 97 | 0.29 | 103 (0.05-1.0 V) | 25 (0.05-1.0 V) | 24 |
| Doctor Blade | Pouch | 2.6 | 29 | 0.90 | 2732 (0.05-1.0 V) | 869 (0.05-1.0 V) | 32 |

Characterization of the anodes is shown in Table 3 below.

TABLE 3

| | | | Resistivity (~1 cm distance, ohms) | Total Mass Loading (mg/cm2) | Thickness (μm) | Calculated Film Density (g/cm3) | $1^{st}$ Charge (mAh/g) | $1^{st}$ Discharge (mAh/g) | 1st Coulombic Efficiency (%) |
|---|---|---|---|---|---|---|---|---|---|
| | LCO Type | Calendared | | | | | | | |
| AJP-5 | SAFT | Hard | 68 | 1.09 | 7 | 1.56 | 68 | 42 | 61 |
| AJP-6 | SAFT | Soft | 68 | 1.00 | 10 | 1.00 | 66 | 42 | 64 |
| AJP-7 | NANO | Soft | 220 | 2.12 | 19 | 1.12 | 82 | 47 | 57 |
| Doctor Blade | SAFT | Hard | — | 30.3 | 87 | 3.50 | 1523 | 148 | 97 |

With hard calendaring, density was observed to increase to about 1.56 for AJP-5, which was lower than the blade coating of about 3.50 suggesting that the lighter components, PVDF and carbon black may have been deposited in the electrode. With lower deposition loading (<0.6 mg/cm$^2$), the AJP SAFT LCO achieved over 66 mAh/g for the $1^{st}$ discharge capacity, albeit lower than the 148 mAh/g for the blade coated LCO, suggesting that the LCO content in the deposited electrode was less than the designed content.

Example 6. Aerosol Jet Printed Lithium Manganese Iron Phosphate (LMFP) Cathode In this example, an LMFP cathode was aerosol jet printed. Compared to aerosol jet printed LCO that had a density of 5.1 LFMP has a lower density of 3.6 g/cm$^3$. This is closer to the densities of the carbon additive and binders used in the printed inks and can result in a higher material pick-up at the AJP nozzle. The LMFP ink formulations were deposited using a pneumatic actuator to aerosolize the solution. The stage temperature was increased to 80° C. to assist in the drying of the layers. A circular wide area nozzle was to increase the surface area covered in each pass, while avoiding uneven printing. A nitrogen sheath was pass through the nozzle at 70 second per cubic centimeter (sccm). A nitrogen flow of 1600 sccm was pass through the actuator was pass through the nozzle, while exhausting at 1000 sccm. The AJP operated at a print speed of 12 mm/s for 20 mins. Subsequent to deposition, the LMFP layer was subjected to a calendaring process, which included applying hard, moderate, and soft pressures resulting in a final electrode thicknesses of 77, 91, and 110 microns, respectively.

The results are provided in Table 4 below.

discharge cycles. The highest discharge capacity of 118 mAh/g with 4.25 V maximum voltage for the aerosol jet printed LMFP cathode material correlated with the AJP-8 sample, which had the highest calendaring pressure and density. This discharge capacity is comparable to the commercial LMFP capacity. The hard-calendared electrode of AJP-8 also exhibited the highest $1^{st}$ coulombic efficiency. Clearly, the data suggests that calendaring is beneficial to increase its electrical conductivity to achieve its full capacity (~18 k Ohms for soft pressed sample AJP-10 compared to the ~3 k Ohms of resistivity for the hard pressed sample AJP-8). The low electric conductivity may suggest that the carbon black in the electrode was not enough or was not homogenous throughout the layer.

Example 7. Aged Aerosol Jet Printed LMFP Cathode

In this example, the LMFP ink formulation that was soft pressed in Example 6 was aged for three days at room temperature. The printing rate for the aged LMFP sample AJP-11 was markedly slower at 4 mg/cm$^2$ compared to 16 mg/cm$^2$ for the fresh LMFP sample AJP-10. The electrochemical properties of half cells were then studied in 2032 coin cells with porous glass fiber/carbon nanofiber (GF/C) separator membranes. The counter/reference electrode was a lithium foil and the electrolyte was 1 M LiPF$_6$ in ethylene carbonate:dimethyl carbonate (EC:DMC) at a volume ratio of 3:7.

As shown in Table 5 below, film density was similar indicating similar active content in each electrode. However, electrical conductivity was significantly higher at 3 k Ohms for the aged AJP-11 LMFP sample compared to 18 k Ohms for the fresh AJP-10 sample with electrochemical perfor-

TABLE 4

| | Calendared | Resistivity (~1 cm distance, ohms) | Total Mass Loading (mg/cm2) | Thickness (μm) | Calculated Film Density (g/cm3) | $1^{st}$ Charge (mAh/g) | $1^{st}$ Discharge (mAh/g) | 1st Coulombic Efficiency |
|---|---|---|---|---|---|---|---|---|
| AJP-8 | Hard | 3k | 17.62 | 77 | 2.29 | 122 | 118 | 97 |
| AJP-9 | Moderate | 20k | 15.20 | 91 | 1.67 | 64 | 55 | 86 |
| AJP-10 | Soft | 18k | 16.80 | 110 | 1.53 | 36 | 30 | 83 |

As shown above, the mass loadings were in excess of 15 mg/cm$^3$ for the different samples AJP-8 through AJP-10. Also, as expected, the harder calendaring pressure resulted in the highest film density.

Figure 8:
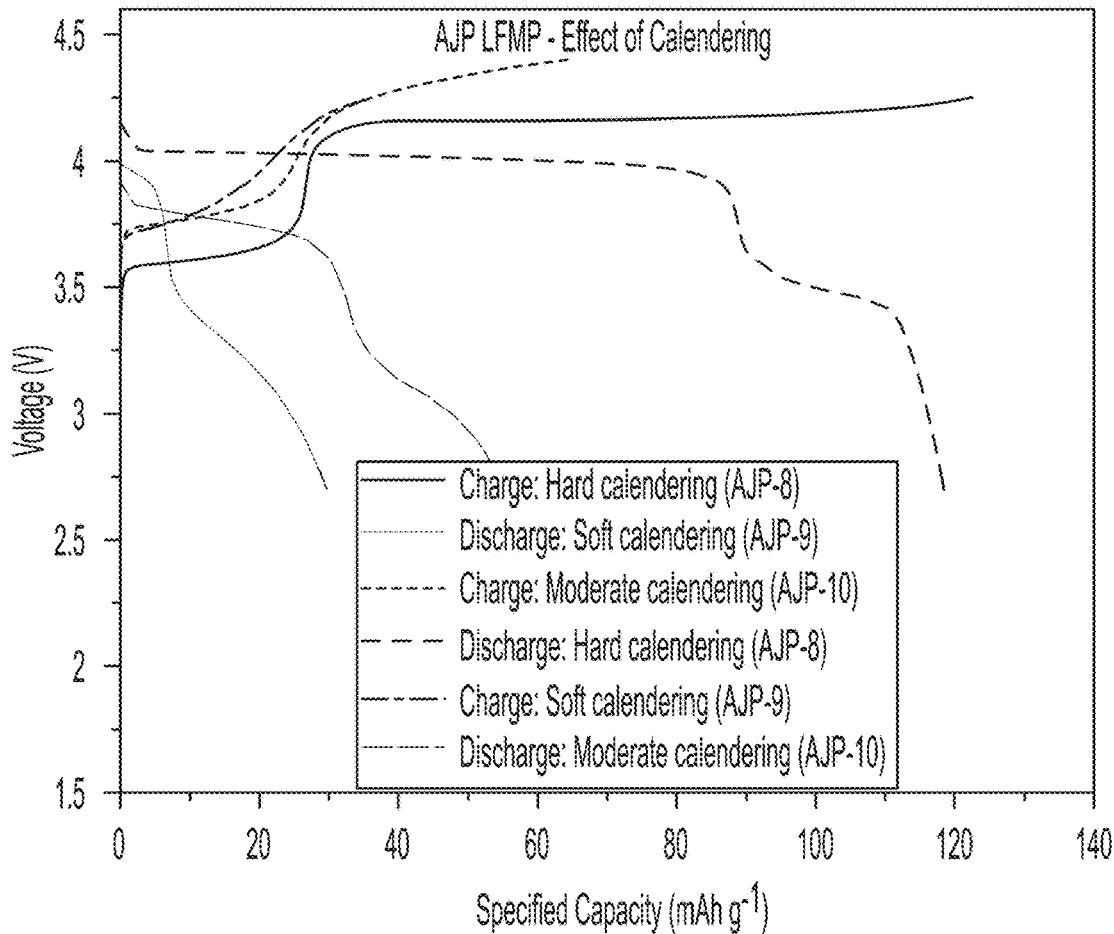
FIG. 8 graphically illustrates calendaring effects on the charge-discharge cycles for a battery including an aerosol jet printed lithium manganese iron phosphate (LMFP) cathode in accordance with the present disclosure.
Figure 9:
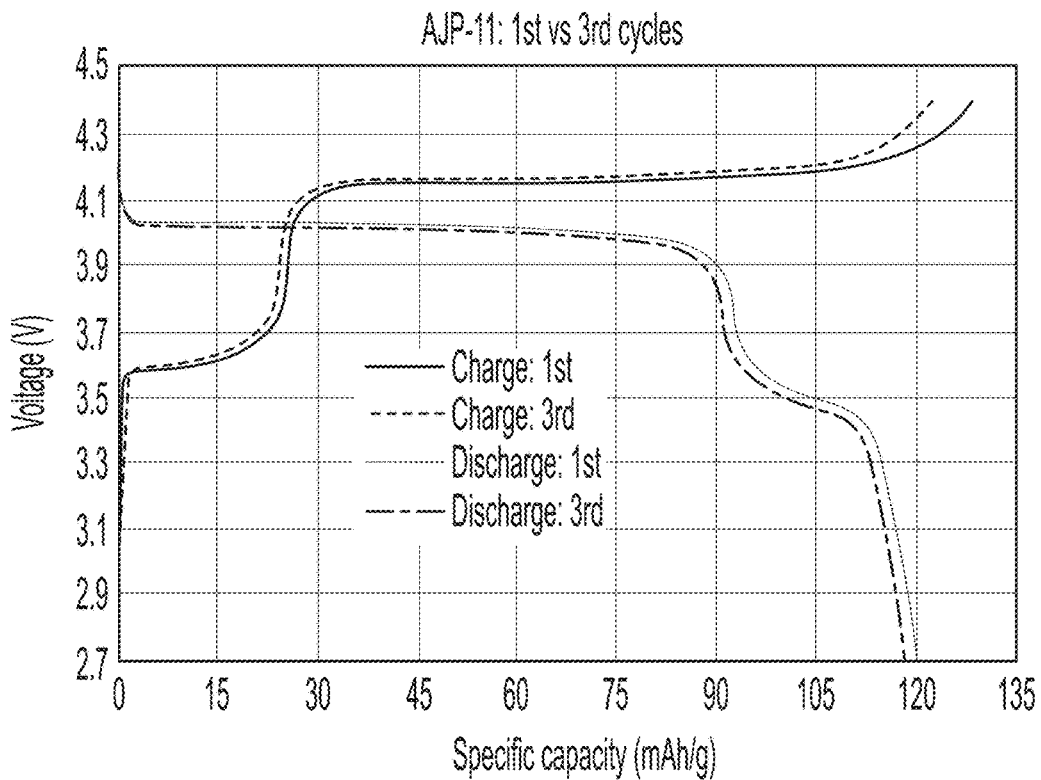
FIG. 9 graphically illustrates ink formulation aging effects on the charge-discharge cycles for a battery including an aerosol jet LMFP cathode in accordance with the present disclosure.
Figure 10:
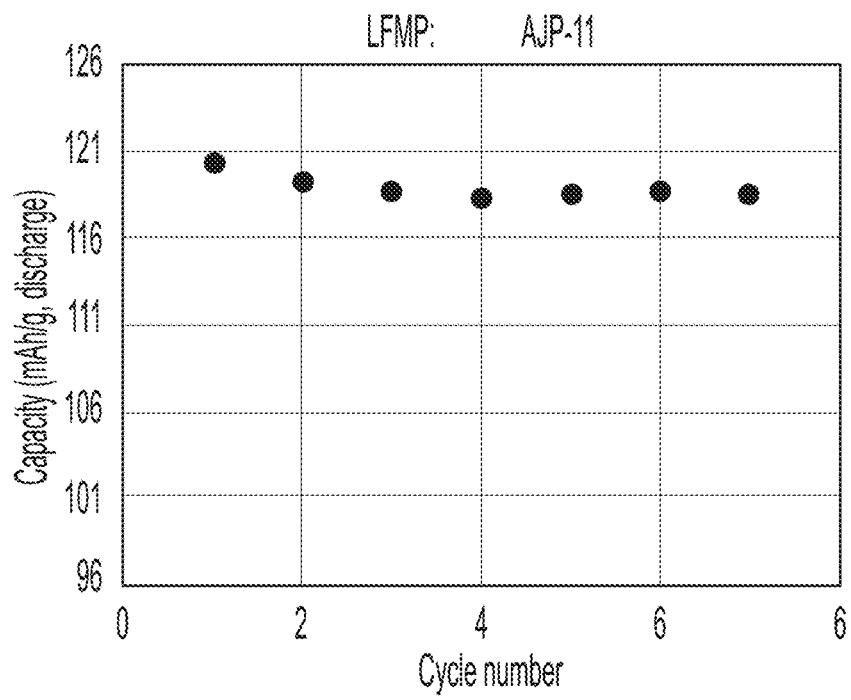
FIG. 10 graphically illustrates capacity as a function of the number of cycles for a battery including an aerosol jet printed LMFP cathode in accordance with the present disclosure.

Turning now to FIG. 8, there is graphically shown the effect of calendaring pressure and density on the charge and mance similar to a comparable fresh hard calendared sample, i.e., the AJP-8 sample shown in Table 4 above. FIG. 9 graphically illustrates the first and third charge discharge cycles for AJP-11. FIG. 10 graphically illustrates discharge capacity as a function of the number of cycles for AJP-11, which was relatively stable.

TABLE 5

| | Calendared | Resistivity (~1 cm distance, ohms) | Total Mass Loading (mg/cm2) | Thickness (μm) | Calculated Film Density (g/cm3) | $1^{st}$ Charge (mAh/g) | $1^{st}$ Discharge (mAh/g) | 1st Coulombic Efficiency (%) |
|---|---|---|---|---|---|---|---|---|
| AJP-10 (Fresh, Ex. 6) | soft | 18k | 16.80 | 110 | 1.53 | 36 | 30 | 83 |
| AJP-11 (aged) | soft | 3k | 4.38 | 28 | 1.56 | 128.5 | 120.3 | 93.6 |

Example 8. Aerosol Jet Printed LMFP with Increased Electrical Conductivity

In this example, an aerosol jet printed LFMP cathode was deposited and compared to a doctor blade formed LFMP. The ink formulations were prepared by forming a slurry containing LMFP (92 wt %), carbon black (5 wt %) and PVDF (3 wt %). The printing process was as previously described above in Example 6. Characterization of the cathode compared to a similar blade coated cathode of the same material is shown in Table 6 below.

TABLE 6

| | Resistivity (distance, ohms) | Total Mass Loading (mg/cm2) | Thickness (μm) | Calculated Film Density (g/cm3) | $1^{st}$ Charge (mAh/g) | $1^{st}$ Discharge (mAh/g) | 1st Coulombic Efficiency (%) |
|---|---|---|---|---|---|---|---|
| AJP-12 | 0.2k, 0.5 cm | 8.16 | 75 | 1.09 | 152 | 147 | 97 |
| Blade Coating | 4k, 1 cm | 2.72 | 29 | 0.94 | 153 | 143 | 94 |

Figure 11:
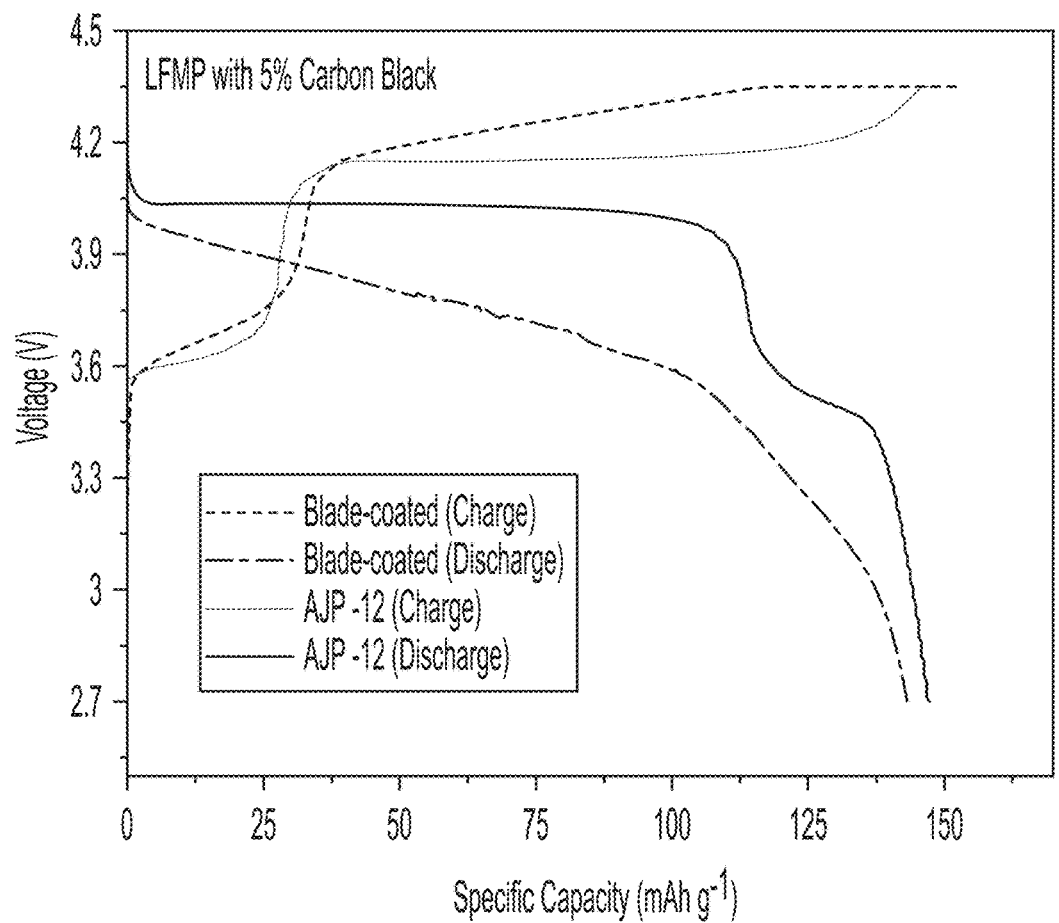
FIG. 11 graphically illustrates charge-discharge cycles for an aerosol jet printed LMFP cathode compared to a blade coated LMFP cathode in accordance with the present disclosure.

As shown above, the electrode resistance decreased with the increase in carbon additive, i.e., the electrical conductivity of the cathode increased. Moreover, the aerosol printed LMFP cathode exhibited a lower resistance than the blade coated cathode that may be attributed to the differences in mass loading. Turning now to the charge-discharge cycle graphically shown in FIG. 11, lithium batteries including the aerosol printed LMFP cathode exhibited similar behavior to substantially the same batteries including the blade coated LMFP cathode and had a reversible capacity of 147 mAh/g.

Example 9. Aerosol Jet Printed Acrylate Separator

In this example, an polyacrylate separator was formed using AJP onto a cathode defined by a commercially available lithium cobalt oxide (LCO) cathode (1.1 mAh/cm²) and an aluminum current collector that was paired with a graphite anode (1.2 mAh/cm²) to form a full cell. The theoretical cell capacity for the full cell was 0.86 mAh, wherein the actual cell capacity was 0.60 mAh. The acrylate separator was formed using a mixture of poly(ethylene glycol)diacrylate (PEGDA) as a precursor and 1% by weight of 2,2-dimethoxyl-2-phenylacetopenone (DMAP) as a photoinitiator and was radically polymerized upon exposure to two UV light sources to partially cure the aerosol mist in stream within the AJP device and to completely cure the substrate subsequent to discharge from the AJP device. The aperture lenses of the light sources were fully opened providing the maximum amount of energy to the photoinitiator of the acrylate separator. The container carrying the solution was wrapped in either foil or Kapton to prevent reflected light from initiating polymerization prior to the misting tube, i.e., before the solution has been aerosolized. Printing time was about 2 hours and resulted in a thickness of about 35 microns.

Figure 12:
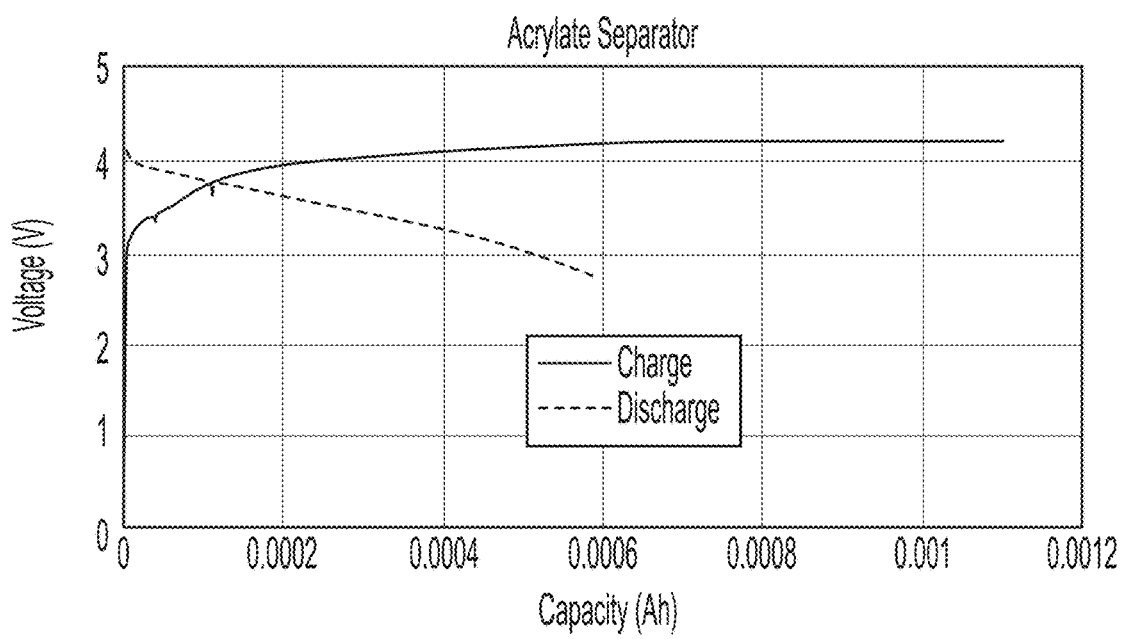
FIG. 12 graphically illustrates charge-discharge cycles for a battery including an aerosol jet printed polyacrylate separator in accordance with the present disclosure.

As demonstrated in the charge-discharge cycle shown in FIG. 12, the AJP printed acrylate separator functioned as an effective electrical insulator with sufficient ionic conductivity. The measured cell capacity using the AJP formed acrylate separator was 0.60 mAh. However, cell resistance was relatively high as the expected average discharge voltage was 3.8V compared to 3.4V that was obtained using the acrylate separator.

Figure 13:
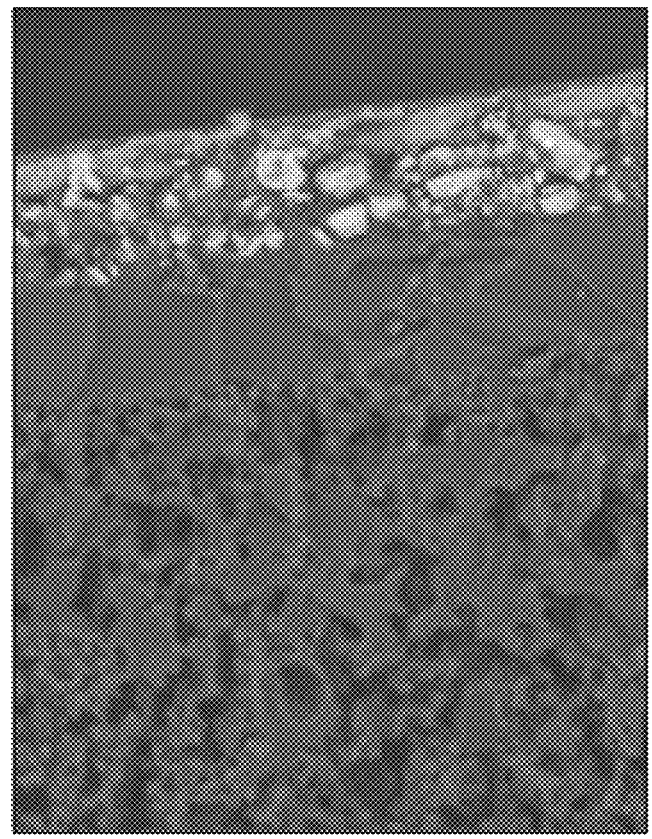
FIG. 13 shows scanning electron micrographs depicting top down and side views of an aerosol jet printed polyacrylate separator in accordance with the present disclosure.
Figure 13:
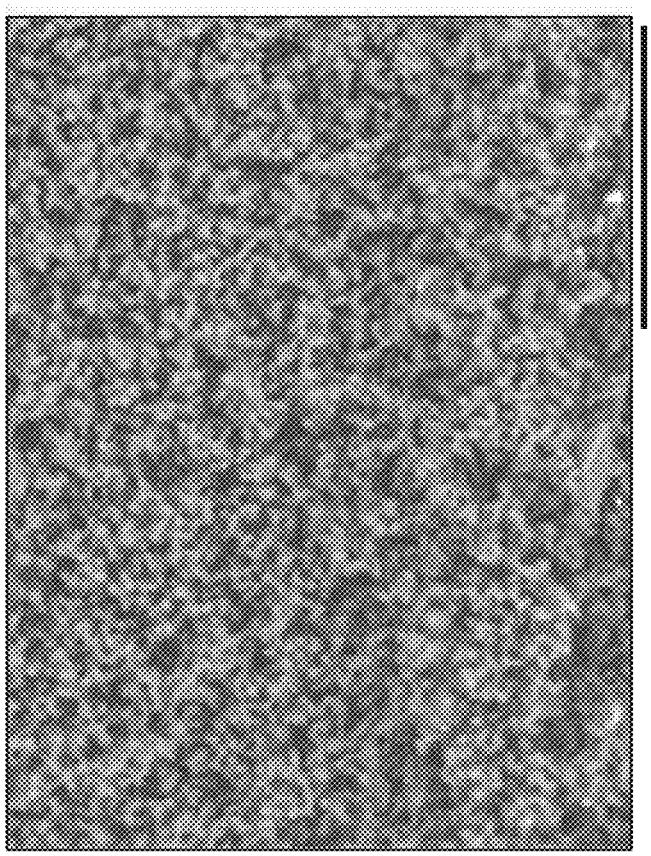

FIG. 13 illustrates scanning electron micrographs of top and side views of the porous acrylate separator formed by AJP. The top view shows spheres of the photopolymerized polyacrylate polymer along with empty pores/spaces therebetween. The polyactylate separator in the side view shows a smooth solid with no visually observed pores/spaces. Further optimization to reduce cell resistance can include faster print speeds to avoid the formation of solid interfaces.

Figure 14:
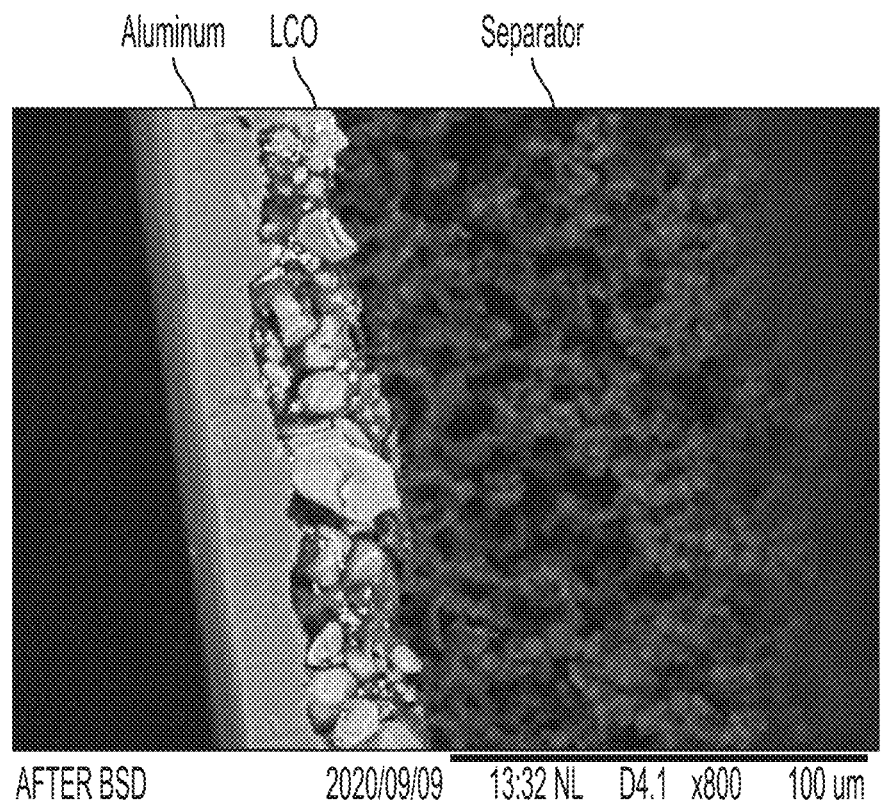
FIG. 14 shows a scanning electron micrograph depicting a side view of an aerosol jet printed polyacrylate separator in accordance with the present disclosure.

Increasing the amount of photoinitiator was found to readily increase printing speed. FIG. 14 illustrates scanning electron micrographs of the polyacrylate separator formed after increasing the photoinitiator from 1 wt % to 2 wt %. The print speed was at about 10 to 12 mm/s, which was close to the maximum for the tool setup. Again, the AJP printed separator appears to have substantially uniform porosity throughout the entire layer with no visible player between the active material and the separator.

Figure 15:
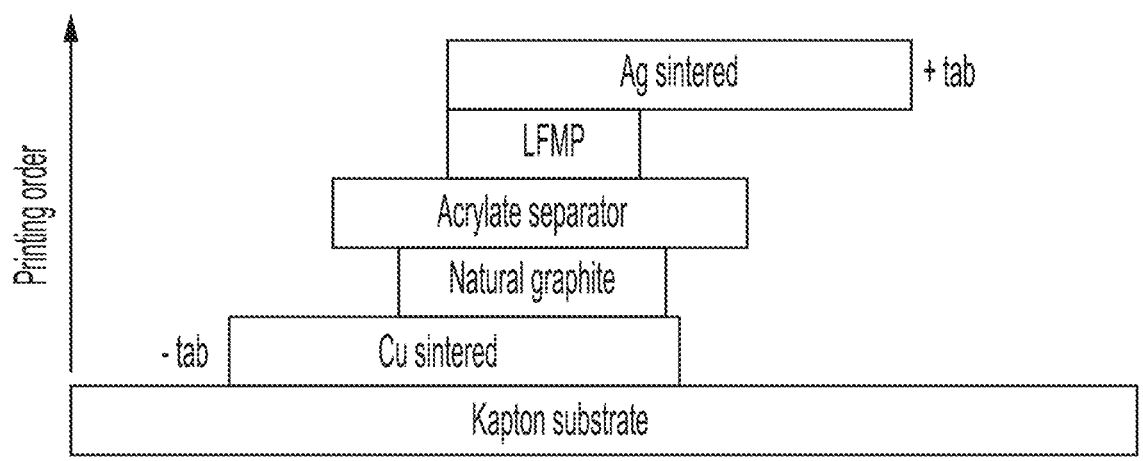
FIG. 15 schematically illustrates a printing order of having each layer formed using aerosol jet printing in accordance with the present disclosure.

Example 10. Aerosol Jet Printed 3-D Full Cell: Cu Collector/NG/Acrylate/LFMP/Ag Collector In this example, full cells were fabricated on a Kapton polyimide substrate using the AJP process. FIG. 15 illustrates a printing order of having each layer formed using aerosol jet printing in accordance with the present disclosure. The fabrication process included first depositing by AJP a copper nanoparticle ink commercially available as Metalon CI006 Novacentric™ copper ink onto the polyimide substrate followed by sintering to form a cohesive copper layer. 850 mW of power was applied to a laser and a pneumatic actuator was used the aerosolize the solution. The stage temperature between at 80° C. to assist in the drying of the layers. A circular wide area nozzle with dimensions having a diameter of 1.5 mm was used to increase the surface area covered in each pass. A nitrogen sheath was pass through the nozzle at 300 sccm (second per cubic centimeter). A nitrogen flow of 1100 sccm was pass through the actuator was pass through the nozzle, while exhausting at 800 sccm. The AJP operated at a print speed of 5 mm/s over one complete pass. The resulting layer of material was then sintered with a focus laser beam using 850 mW of power over the previously created copper sample. A speed of 5 mm/s with a spacing of 0.25 mm was utilized so that the laser beam overlaps making contact with the full sample.

After formation of the copper current collector on the substrate, a natural graphite anode layer was then AJP printed onto the copper current collector. The pneumatic actuator was used to aerosolize the solution, and a stage temperature of 80° C. was used to assist in the drying of the layers. A circular wide area nozzle with dimensions a diameter of 1.5 mm was to increase the surface area covered in each pass. A nitrogen sheath was pass through the nozzle at 100 seconds per cubic centimeter (sccm). A nitrogen flow of 1150 sccm was pass through the actuator was pass through the nozzle, while exhausting at 1100 sccm. The AJP operated at a print speed of 4 mm/s for 20 minutes, which allowed for deposition of the NG/PVDF nanoparticle slurry dispersed by creating a mist of the particles guided by a carrier gas. The printer included a 1.5 mm nozzle and a printing rate was about 1.0 mg/cm$^2$. The printed pattern was then heated at a temperature of 80° C. for a period of throughout the printing process. After formation, a glass vial was manually rolled over the sample in or to assist in the contact and compaction between each layer. The anode was then placed in a vacuum oven at 120° C. for a minimum of 2 hours.

Following this drying step, the sample was returned to the AJP device and properly aligned on the stage for the printing of the porous polyacrylate separator. Again, the polyacrylate separator was formed using AJP directly onto the Cu/NG stack. The acrylate separator was formed using a mixture of poly(ethylene glycol)diacrylate (PEGDA) as a precursor and 1% by weight of 2,2-dimethoxyl-2-phenylacetopenone (DMAP) as a photoinitiator and was radically polymerized upon exposure to two UV light sources to partially cure the aerosol mist in stream within the AJP device and completely cure the substrate subsequent to discharge from the AJP device. The aperture lenses of the light sources were fully opened providing the maximum amount of energy to the photoinitiator of the acrylate separator The container carrying the solution was wrapped in either foil or Kapton to prevent reflected light from initiating polymerization prior to the misting tube, i.e., before the solution has been aerosolized. Printing time was about 2 hours and resulted in a thickness of about 35 microns. The new stack was again rolled by a glass vial and placed into a vacuum oven at 120° C. for a minimum of 2 hours.

The three layer stack was again aligned on the AJP to begin the printing of the LFMP cathode layer. The LMFP ink formulation were deposited using a pneumatic actuator to aerosolize the solution. The stage temperature was increased to 80° C. to assist in the drying of the layers. A circular wide area nozzle was to increase the surface area covered in each pass, while avoiding uneven printing. A nitrogen sheath was pass through the nozzle at 70 second per cubic centimeter (sccm). A nitrogen flow of 1600 sccm was pass through the actuator was pass through the nozzle, while exhausting at 1000 sccm. The AJP operated at a print speed of 12 mm/s for 20 mins. By using this high printing speed we are able to avoid the NMP pooling and soaking through the previous layers of the cell. Another round of rolling the vial and drying was completed prior to AJP deposition of the final layer of the cell.

After aligning the now four layer stack, a silver powder was AJP deposited and sintered to form the silver current collector for the cathode layer. Once assembled, the full cell was filled with a liquid electrolyte.

Figure 16:
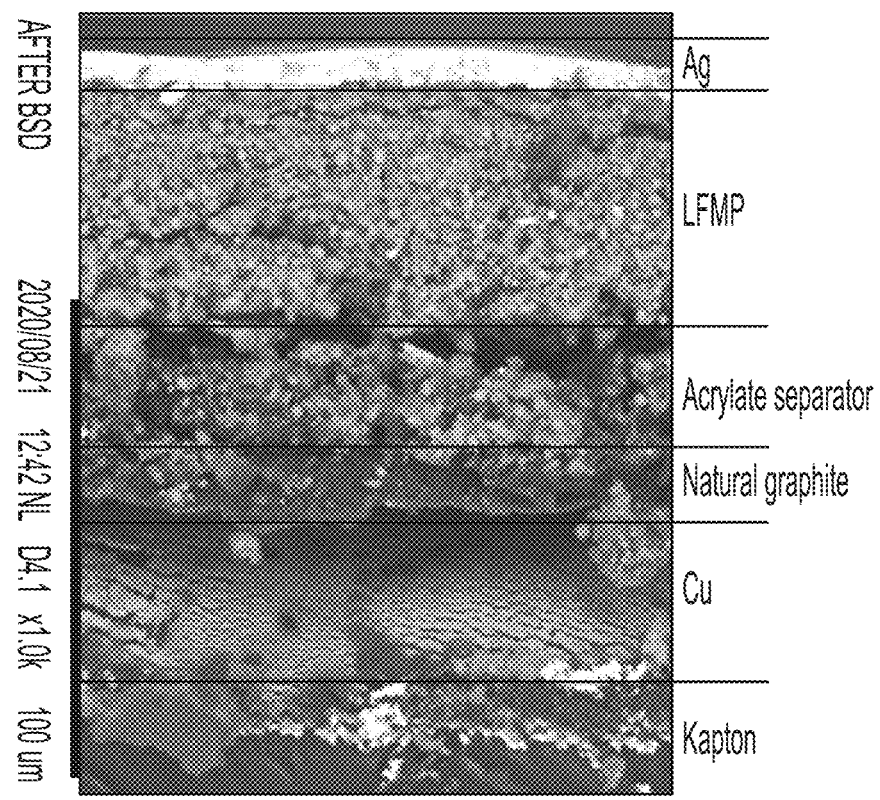
FIG. 16 illustrates a cross-sectional scanning electron micrograph of an full cell formed using aerosol jet printing utilizing the printing order of FIG. 15 in accordance with the present disclosure.

FIG. 16 illustrates a cross-sectional scanning electron micrograph of the full cell.

Figure 17:
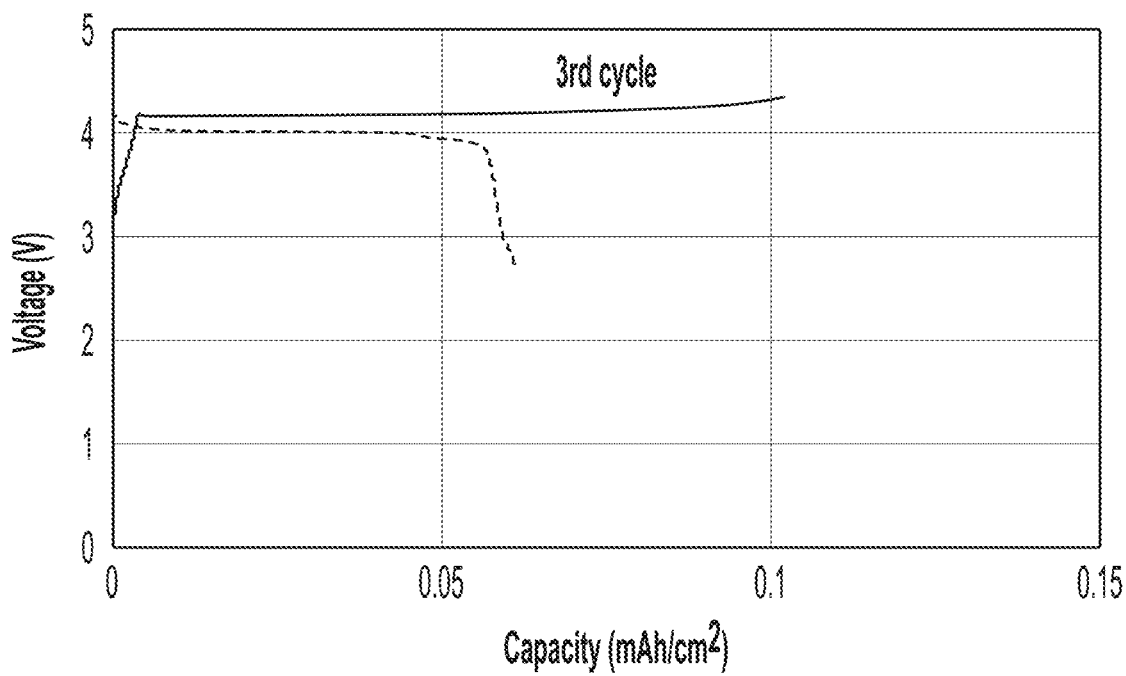
FIG. 17 graphically illustrates a charging-discharging cycle after the third cycle for a full cell formed using aerosol jet printing in accordance with the present disclosure.

Example 11. Aerosol Jet Printed 3-D Full Cell: Cu Current Collector/NG/Acrylate/LMFP/NG Current Collector In this example, a full cell was fabricated as in Example 10 with a natural graphite (NG) current collector replacing the silver current collector in the previous example. Similar parameters are used such as the pneumatic actuator was to aerosolize the solution, and a stage temperature of 80° C. Also the use of the circular wide area nozzle with dimensions a diameter of 1.5 mm was utilized and a nitrogen sheath was pass through the nozzle at 100 seconds per cubic centimeter (sccm). A nitrogen flow of 1150 sccm was passed through the nozzle, while exhausting at 1100 sccm. The primary change relative to Example 10 was in the printing speed, increasing from 4 mm/s to 8 mm/s, which was done to support faster drying of the solvent and prevent dissolution of any of the previous layers. The full cells were capable of being charged without shortening. FIG. 17 graphically depicts the charge-discharge cycle after the 3$^{rd}$ cycle for the full cell, which demonstrates that the cell could be cycled with charge-discharge and with reasonable discharge capacity.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing a three-dimensional electrochemical lithium battery, the method comprising:
   forming a first electrode on an underlying layer comprising aerosolizing a first ink formulation comprising a slurry including nanoparticles or microparticles of a first active material and a first binder, and depositing the slurry onto the underlying layer to form a first electrode layer;
   forming a porous polymeric permeable separator layer on the first electrode comprising aerosolizing a polymer precursor solution including one or more monomers, a photoinitiator, and a solvent, exposing the aerosolized polymer precursor solution to a first activating radiation source to form partially cured polymer spheres in the aerosolized stream, focusing and directing the aerosolized stream onto the first electrode to form a layer of the partially cured polymer spheres, and exposing the layer of the partially cured polymer spheres to a second activating radiation source to fully cure the partially cured polymer spheres and form the porous polymeric permeable separator layer comprising a plurality of tortuous pathways;
   forming a second electrode on the porous polymeric permeable separator layer comprising aerosolizing a second ink formulation comprising a slurry including nanoparticles or microparticles of a second active material and a second binder, and depositing the slurry onto the permeable separator layer; and
   filling the three-dimensional electrochemical lithium battery with a liquid electrolyte.

2. The method of manufacturing the three-dimensional electrochemical lithium battery of claim 1, wherein the underlying layer is a first current collector and the lithium battery further comprises a second current collector on the second electrode.

3. The method of manufacturing the three-dimensional electrochemical lithium battery of claim 2, further comprising forming the first current collector by aerosolizing a slurry comprising a powder composition representative of the first current collector onto a substrate followed by sintering and forming the second current collector by aerosolizing a slurry comprising a powder composition representative of the second current collector onto the second electrode followed by sintering.

4. The method of manufacturing the three-dimensional electrochemical lithium battery of claim 1, wherein the first and second ink formulations have a viscosity within a range of about 1 to 2000 cP.

5. The method of manufacturing the three-dimensional electrochemical lithium battery of claim 1, wherein the first and second active material have a particle size within a range of about 100 nanometers to about 7 micrometers.

6. The method of manufacturing the three-dimensional electrochemical lithium battery of claim 1, wherein the porous polymeric permeable separator layer comprises a polyacrylate.

7. The method of manufacturing the three-dimensional electrochemical lithium battery of claim 1, wherein the first electrode comprises silicon, carbon, graphite, natural graphite, lithium titanate, and combinations including at least one of the foregoing, and the second electrode comprises lithium nickel cobalt aluminum oxides, lithium cobalt oxides, lithium nickel manganese oxide, lithium manganese iron phosphates, lithium iron phosphate, lithium manganese oxide, lithium nickel cobalt oxide, lithium nickel cobalt aluminum oxide, lithium nickel cobalt manganese oxide, and combinations including at least one of the foregoing.

8. The method of manufacturing the three-dimensional electrochemical lithium battery of claim 7, wherein the underlying layer is a copper current collector and the lithium battery further comprises an aluminum current collector on the second electrode.

9. The method of manufacturing the three-dimensional electrochemical lithium battery of claim 8, wherein the copper and the aluminum current collectors are sintered from a deposited powder containing the copper and aluminum, respectively.

10. The method of manufacturing the three-dimensional electrochemical lithium battery of claim 1, wherein a ratio of the first active material relative to the first binder is about 4 parts to about 2 parts by weight of the first active material to 1 part by weight of the first binder and the ratio of the second active material relative to the second binder is about 4 parts to about 2 parts by weight of the second active material to 1 part by weight of the second binder.

11. An aerosol jet printing method for manufacturing a porous polymeric permeable separator layer for a battery, the method comprising:
   aerosolizing a solution comprising a polymer precursor including one or more monomers, a photoinitiator and a solvent to generate an aerosolized stream within an aerosol jet printing device;
   exposing the aerosolized stream to a first activating radiation source to form partially cured polymer spheres therein;
   focusing and discharging the aerosolized stream of partially cured polymer spheres from the aerosol jet printing device onto a substrate to form a layer of the partially cured polymer spheres; and
   exposing the layer of the partially cured polymer spheres to a second activating radiation source subsequent to the discharging to fully cure the partially cured polymer spheres and form the porous polymeric permeable separator layer, wherein the porous polymeric permeable separator layer comprises pores defining a plurality of tortuous pathways and has a thickness in a range from 10 micrometers to 200 micrometers.

12. The aerosol jet printing method claim 11, wherein the first and second activating radiation sources are the same.

13. The aerosol jet printing method of claim 11, wherein the porous polymeric permeable separator layer comprises a polyacrylate.

14. The aerosol jet printing method of claim 11, wherein the solution has a viscosity of 1 to 2000 cP.

15. The aerosol jet printing method of claim 11, wherein the porous polymeric permeable separator layer is at a thickness in a range of about 15 micrometers to about 100 micrometers.

16. The aerosol jet printing method of claim 11, wherein the porous polymeric permeable separator layer comprises polyacrylate, polyvinylidene fluoride, poly(vinylidene fluoride-hexafluoropropylene, poly(ethylene oxide), poly(vinyl alcohol) or polyacrylonitrile.

\* \* \* \* \*